US007422080B2

(12) United States Patent
Suzuki et al.

(10) Patent No.: US 7,422,080 B2
(45) Date of Patent: Sep. 9, 2008

(54) IN-WHEEL MOTOR SYSTEM

(75) Inventors: Yasuhiro Suzuki, Tokyo (JP); Katsumi Tashiro, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 91 days.

(21) Appl. No.: 10/584,153

(22) PCT Filed: Dec. 9, 2004

(86) PCT No.: PCT/JP2004/018396

§ 371 (c)(1),
(2), (4) Date: Jun. 22, 2006

(87) PCT Pub. No.: WO2005/061255

PCT Pub. Date: Jul. 7, 2005

(65) Prior Publication Data

US 2007/0107959 A1    May 17, 2007

(30) Foreign Application Priority Data

Dec. 24, 2003 (JP) ............................. 2003-427557
Sep. 14, 2004 (JP) ............................. 2004-266559

(51) Int. Cl.
*B60K 1/00* (2006.01)
(52) U.S. Cl. ..................................... 180/65.5; 180/65.1
(58) Field of Classification Search ............... 180/65.5, 180/65.1
See application file for complete search history.

(56) References Cited

U.S. PATENT DOCUMENTS 2,537,479 A * 1/1951 Motte ......................... 180/385

(Continued)

FOREIGN PATENT DOCUMENTS

JP          4-088210 A      3/1992

(Continued)

OTHER PUBLICATIONS

Microfilm of the specification and drawings annexed to the request of Japanese Utility Model Application No. 74615/1973 (Laid-open No. 20954/1975) (Mitsubishi Electric Corp.), Mar. 10, 1975.

(Continued)

*Primary Examiner*—Christopher Ellis
*Assistant Examiner*—John R. Olszewski
(74) *Attorney, Agent, or Firm*—Sughrue Mion, PLLC

(57) ABSTRACT

An in-wheel motor system having a flexible coupling for transmitting the drive torque of a motor to a wheel. The flexible coupling 10 simple in structure and easily assembled comprises a motor-side plate (11A) mounted to the rotating side case of the motor, a wheel-side plate (11C) mounted to the wheel or a hub, an intermediate plate (11B) disposed between these two plates (11A) and (11C), a first rubber member (12a) of generally rectangular shape in plan view which connects the motor-side plate (11A) to the intermediate plate (11B) in such a manner that they can move relative to each other in a direction (direction B) orthogonal to their connection direction (direction A), and a second rubber member (12b) formed in the same manner as the first rubber member (12a) which connects the intermediate plate (11B) to the wheel side plate (11C) in such a manner that they can move relative to each other in the direction A orthogonal to the direction B.

6 Claims, 8 Drawing Sheets

U.S. PATENT DOCUMENTS

| | | | | |
|---|---|---|---|---|
| 4,991,698 | A | * | 2/1991 | Hanson .................. 188/380 |
| 5,468,055 | A | * | 11/1995 | Simon et al. ............ 301/6.91 |
| 5,927,414 | A | * | 7/1999 | Kan et al. ................ 180/19.3 |
| 6,364,078 | B1 | * | 4/2002 | Parison et al. ............ 188/380 |
| 7,287,611 | B2 | * | 10/2007 | Nagaya .................. 180/65.5 |
| 2006/0144626 | A1 | * | 7/2006 | Mizutani et al. .......... 180/65.5 |
| 2007/0068715 | A1 | * | 3/2007 | Mizutani et al. .......... 180/65.5 |

FOREIGN PATENT DOCUMENTS

| | | |
|---|---|---|
| JP | 4-151019 A | 5/1992 |
| JP | 4-219526 A | 8/1992 |
| JP | 7-279987 A | 10/1995 |
| JP | 8-145068 A | 6/1996 |
| WO | WO 2002/083446 A1 | 10/2002 |

OTHER PUBLICATIONS

CD-ROM of the specification and drawings annexed to the request of Japanese Utility Model Application No. 13166/1992 (Laid-open No. 64537/1993) (Toyo Tire and Rubber Co., Ltd.) (Aug. 27, 1993).

Microfilm of the specification and drawings annexed to the request of Japanese Utility Model Application No. 146636/1989 (Laid-open No. 84422/1991) (Ricoh Co. Ltd.), Aug. 27, 1991.

* cited by examiner

IN-WHEEL MOTOR SYSTEM

BACKGROUND OF THE INVENTION

1. Field of the Invention

The present invention relates to an in-wheel motor system for use in a vehicle having direct drive wheels as drive wheels.

2. Description of the Prior Art

It is generally known that, in a vehicle having a suspension mechanism such as a spring around a wheel, as the mass of parts under the spring such as a wheel, knuckle and suspension arm, so-called "unsprung mass" increases, changes in the ground holding force of a tire when running on an uneven road become larger, thereby deteriorating road holding properties.

In a vehicle driven by a motor such as an electric car, an in-wheel motor system incorporating a motor in a wheel is being employed. However, in a conventional in-wheel motor whose non-rotating part is fixed to a spindle shaft connected to a part such as an upright or knuckle which is one of the parts around a wheel of the vehicle and whose rotor as a rotating part can rotate together with the wheel, the above unsprung mass increases by the weight of the in-wheel motor, whereby changes in the ground holding force of the tire become large, thereby deteriorating road holding properties (refer to patent documents 1 to 3, for example).

To solve the above problem, there is proposed an in-wheel motor system as shown in FIG. 6 in which a non-rotating side case 3a supporting a stator 3S is elastically supported to a knuckle 5 as a part around the wheel of a vehicle by a buffer mechanism 50 having two plates 54 and 55 whose moving directions are limited to the vertical direction of the vehicle by direct-acting guides 51 and which are interconnected by springs 52 and a damper 53 moving in the vertical direction of the vehicle and a rotating side case 3b supporting a rotor 3R and a wheel 2 are interconnected by a flexible coupling 60 as a drive force transmission mechanism which can become eccentric in the radical direction of the wheel 2 (refer to patent document 4, for example).

More specifically, as shown in FIG. 9, the above flexible coupling 60 comprises a plurality of hollow disk-like plates 61A to 61C and direct-acting guides 62A and 62B for interconnecting between the adjacent plates 61A and 61B and between the adjacent plates 61B and 61C and guiding the above adjacent plates 61A and 61B and the adjacent plates 61B and 61C in the radial direction of the disk. As shown in FIG. 10, each of the above direct-acting guides 62A and 62B comprises a guide rail 62x having a projection extending in the radial direction of the above plates 61A to 61C, a guide member 62y having a recess extending in the radial direction of the above plates 61A to 61C to be engaged with the above guide rail 62x, and a plurality of steel balls 62m interposed between the projection of the above guide rail 62x and the recess of the guide member 62y to smoothly slide the above guide rail 62x and the guide member 62y.

Since the above guide rail 62x and the guide member 62y slide so as to guide the above adjacent plates 61A and 61B and the adjacent plates 61B and 61C in the radial direction of the disk, the in-wheel motor 3 can move in the working direction of the above direct-acting guides 62A and 62B, that is, the radial direction of the disk but not in the rotation direction. Therefore, by connecting the rotating side case 3b of the motor 3 to the wheel 2 by the above flexible coupling 60, drive torque can be transmitted from the motor 3 to the wheel 2 efficiently.

In the in-wheel motor system constituted as described above, the in-wheel motor 3 is float mounted to a part around the wheel of the vehicle by the buffer mechanism 50 so that the motor 3 itself can be used as the weight of a dynamic damper, thereby making it possible to improve ground holding performance and riding comfort when running on a bad road. Since the motor shaft and the wheel shaft are interconnected by the above flexible coupling 60 in such a manner that they can become eccentric to each other in any direction, torque can be transmitted from the motor 3 to the wheel 2 efficiently.

Patent document 1: Japanese Patent No. 2676025
Patent document 2: Japanese Examined Patent Publication No. 9-506236
Patent document 3: Japanese Unexamined Patent Application No. 10-305735
Patent document 4: WO 02/083446 A1

SUMMARY OF THE INVENTION

Although the above flexible coupling 60 can transmit the drive torque of the motor 3 to the wheel 2 efficiently, as it has a large number of parts and comprises direct-acting guides 62A and 62B which require high assembly accuracy, it takes long to mount the above direct-acting guides 62A and 62B to the above plates 61A to 61C, thereby reducing productivity. Further, since the above direct-acting guides 62A and 62B are expensive, the whole system costs dear.

It is an object of the present invention which has been made in view of the above problem to provide an in-wheel motor system capable of transmitting the drive torque of a motor to a wheel very efficiently with simple constitution and comprising a flexible coupling which can be assembled easily.

According to a first aspect of the present invention, here is provided an in-wheel motor system having a hollow direct drive motor which is provided in a wheel and whose stator side is supported to a part around the wheel of a vehicle by elastic bodies and/or an attenuation mechanism, wherein a motor rotor and a wheel or a hub are interconnected by a coupling mechanism which comprises a motor-side plate connected to a rotating side case of the motor, a wheel-side plate connected to the wheel or hub, an intermediate plate interposed between the two plates, and first and second connection members for interconnecting the motor-side plate and the intermediate plate and interconnecting the intermediate plate and the wheel-side plate in such a manner that the interconnected plates can move relative to each other in a direction where the stiffness of the connection members themselves is low, the first and second connection members being arranged such that the directions where their stiffness is low become orthogonal to each other.

According to a second aspect of the present invention, there is provided an in-wheel motor system wherein at least one pair of either one or both of the first and second connection members are provided, and the paired connection members are arranged at positions where they become symmetrical to the center line of the plane of the plates.

According to a third aspect of the present invention, there is provided an in-wheel motor system wherein the first and second connection members are made of rubber or resin whose length in the connection direction is larger than the length in the direction orthogonal to the connection direction. The above "connection direction" refers to a direction for interconnecting a connection portion between the above motor-side plate and the above first connection member and a connection portion between the intermediate plate connected to the motor-side plate by the first connection member and the above first connection member in the above first connection member and a direction for interconnecting a connection portion between the intermediate plate and the second connection member and a connection portion between the wheel-side plate connected to the intermediate plate by the second connection member and the above second connection member in the second connection member.

According to a fourth aspect of the present invention, there is provided an in-wheel motor system wherein pin members are provided on the opposed surfaces of the motor-side plate and the intermediate plate and on the opposed surfaces of the intermediate plate and the wheel-side plate and interconnected by a steel cord or steel wire.

According to a fifth aspect of the present invention, there is provided an in-wheel motor system wherein the first and second connection members are attached to the respective plates through a bearing or rubber bush.

According to a sixth aspect of the present invention, there is provided an in-wheel motor system wherein the first and second connection members are attached to the respective plates while they are compressed in the connection direction.

According to the present invention, the motor rotor and the wheel or hub are interconnected by a coupling mechanism which comprises a motor-side plate, wheel-side plate, intermediate plate, and first and second connection members for interconnecting the motor-side plate and the intermediate plate and interconnecting the intermediate plate and the wheel-side plate in such a manner that the connected plates can move relative to each other in a direction where the stiffness of the connection members themselves is low, for example, rubber members whose length is large in the connection direction, therefore, whose stiffness is high in the connection direction and low in the direction orthogonal to the connection direction, the first and second connection members being arranged such that the directions where their stiffness is low become orthogonal to each other and which is simple in structure and has a small number of parts. Therefore, the coupling mechanism is easily assembled, thereby making it possible to improve work efficiency.

At this point, when at least one pair of either one or both of the above first and second connection members are provided and the paired connection members are arranged at positions where they become symmetrical to the center line of the plane of the plates, unrequired twist can be prevented, thereby making it possible to transmit the torque of the motor without fail.

When the above first and second connection members are attached to the respective plates through a bearing or a rubber bush, the movement of the coupling mechanism becomes smooth, thereby making it possible to further improve power transmission efficiency.

When the above first and second connection members are attached to the respective plate while they are compressed in the connection direction, the stroke between the plates can be made long, thereby making it possible to handle input of large vibration.

DETAILED DESCRIPTION OF THE PREFERRED EMBODIMENTS

Preferred embodiments of the present invention will be described hereinunder with reference to the accompanying drawings.

Figure 1:
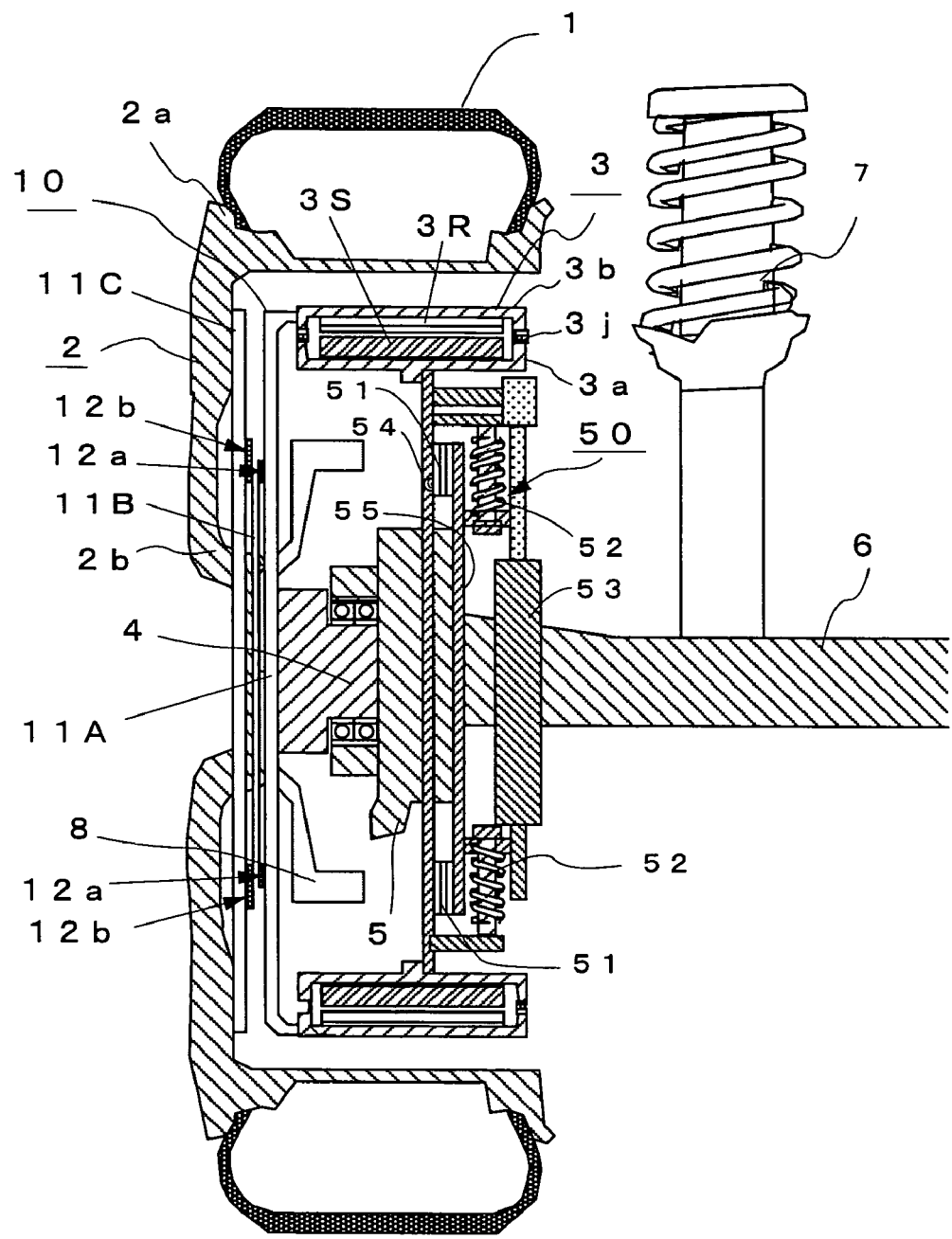
FIG. 1 is a longitudinal sectional view showing the constitution of an in-wheel motor system according to an embodiment of the present invention.

FIG. 1 shows the constitution of an in-wheel motor system according to a preferred embodiment of the present invention. In FIG. 1, reference numeral 1 denotes a tire, 2 a wheel consisting of a rim 2a and a wheel disk 2b, and 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction.

Numeral 4 denotes a hub connected to the wheel 2 at its rotary shaft, 5 a knuckle connected to an axle 6, 7 a suspension member composed of a shock absorber, 8 a brake unit composed of a brake disk mounted to the above hub 4, 10 a rubber flexible coupling of the present invention for connecting the rotating side case 3b supporting the rotor 3R to the wheel 2, which comprises a motor-side plate 11A connected to the above rotating side case 3b, a wheel-side plate 11C connected to the wheel 2, an intermediate plate 11B interposed between the two plates 11A and 11C, and first and second rubber members 12a and 12b as first and second connection members for connecting the above motor-side plate 11A to the intermediate plate 11B and the above intermediate plate 11B to the wheel-side plate 11C, and 50 a buffer mechanism for elastically supporting the non-rotating side case 3a supporting the stator 3 to the knuckle 5 as a part around the wheel of the vehicle, comprising two plates 54 and 55 whose moving directions are limited to the vertical direction of the vehicle by direct-acting guides 51 and which are interconnected by springs 52 and a damper 53 moving in the vertical direction of the vehicle.

Figure 2A:
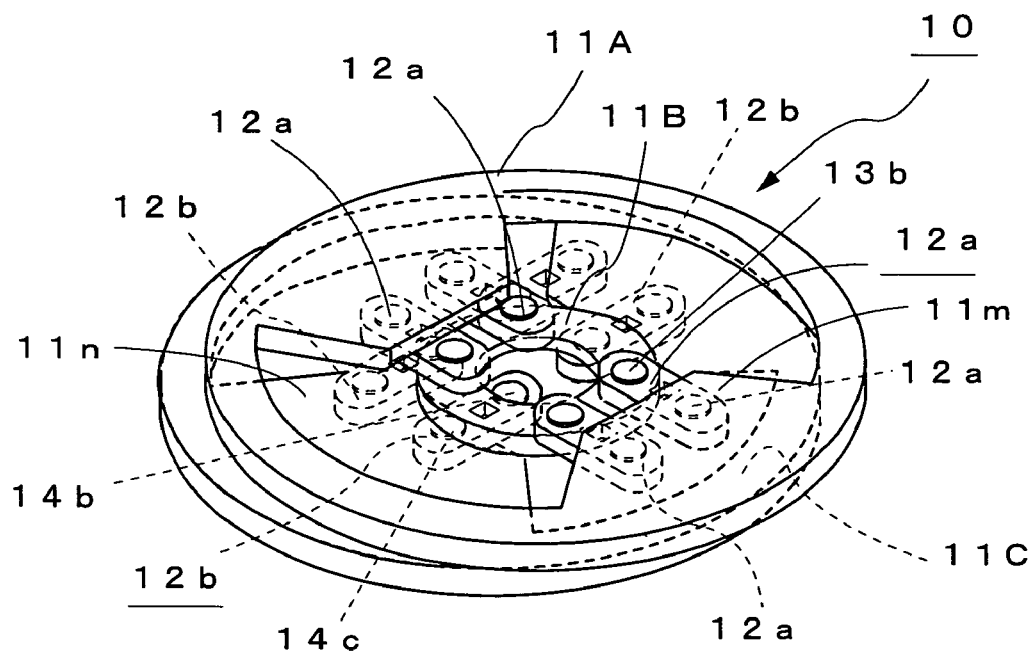
FIGS. 2(a) and 2(b) are diagrams showing the constitution of a flexible coupling in the embodiment.
Figure 2B:
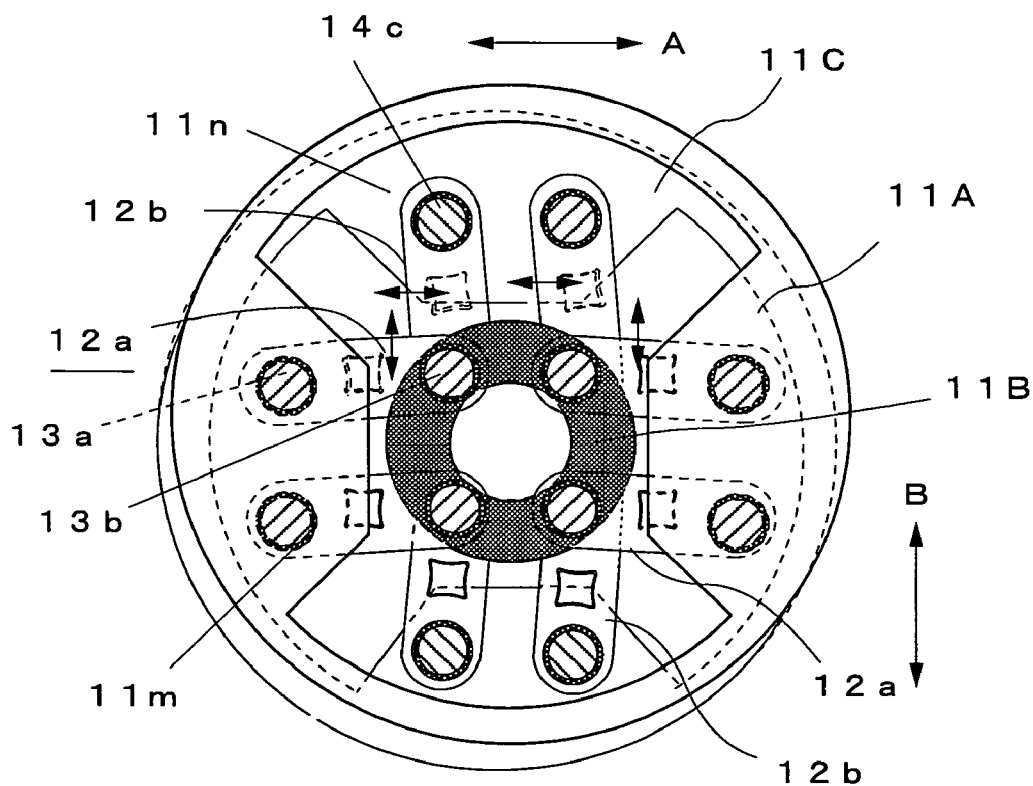

FIGS. 2(a) and 2(b) show the details of the above flexible coupling 10. The motor-side plate 11A is provided with four pin members 13a projecting toward the intermediate plate 11B, the above intermediate plate 11B is provided with four pin members 13b projecting toward the above motor-side plate 11A, and both end portions of the first rubber members 12a having a substantially rectangular shape in plan view which are first connection members are mated with the above pin members 13a and 13b to connect the motor-side plate 11A to the intermediate plate 11B. At this point, the above four rubber members 12a are arranged in such a manner that two out of the above four rubber members 12a become symmetrical to the other two in the horizontal direction and the above pin members 13a and 13b are positioned to ensure that all of the lengthwise directions of the rubber members 12a become parallel to the direction A when the lengthwise directions of the four rubber members 12a are parallel to the direction A in FIGS. 2(a) and 2(b).

The rear surface opposite to the above pin members 13b of the above intermediate plate 11B is provided with four pin members 14b projecting toward the wheel-side plate 11C, the wheel-side plate 11C is provided with four pin members 14c projecting toward the above intermediate plate 11B, both end portions of the second rubber members 12b having a substantially rectangular shape in plan view which are second connection members are mated with the above pin members 14b and 14c to connect the intermediate plate 11B to the wheel-side plate 11C. At this point, the above four rubber members 12b are arranged in such a manner that two out of the above rubber members 12b become symmetrical to the other two in the vertical direction and the above pin members 14b and 14c are positioned to ensure that all of the lengthwise directions of the rubber members 12b become parallel to the direction B when the lengthwise directions of the four rubber members 12a are parallel to the direction B orthogonal to the direction A in these figures.

Thereby, the motor-side plate 11A and the intermediate plate 11B are connected to each other in the direction of connecting the above pin members 13a and 13b, that is, the lengthwise direction (direction A) of the first rubber members 12a, and the above intermediate plate 11B and the wheel-side plate 11C are connected to each other in the direction of connecting the above pin members 14b and 14c, that is, the lengthwise direction (direction B) of the second rubber members 12b which is the direction orthogonal to the lengthwise direction of the above first rubber members 12a.

Since the rubber members 12a and 12b are fixed in their lengthwise direction (direction A or B) by mounting them as described above, they have high stiffness and hardly expands. However, as they are not fixed in the cross direction, they have low stiffness. Therefore, as shown in FIG. 2(b), the motor-side plate 11A and the intermediate plate 11B interconnected by the first rubber members 12a can move relative to each other in the direction B orthogonal to the lengthwise direction of the above first rubber members 12a whereas the wheel-side plate 11C and the intermediate plate 11B can move relative to each other in the direction A orthogonal to the lengthwise direction of the above second rubber members 12b. Meanwhile, as the above rubber members 12a and 12b have high stiffness and hardly expand in the rotational direction of the above plates 11A to 11C, the motor-side plate 11A and the wheel-side plate 11C can move parallel to each other in all the directions. Therefore, even when the motor shaft and the wheel shaft become eccentric to each other, this eccentricity can be absorbed by the transformation in the cross direction of the above rubber members 12a and 12b, thereby making it possible to transmit the torque of the motor 3 to the wheel 2 smoothly.

Although the above plates 11A to 11C may have the same shape, the diameter of the intermediate plate 11B may be made small and the ring widths of the motor-side plate 11A and the wheel-side plate 11C may be made small as shown in FIGS. 2(a) and 2(b). In this case, projections 11m and 11n projecting toward the pin members 13b on the intermediate plate 11B from the peripheries of the above plates 11A and 11C may be provided, and the above pin members 13a and 14c may be mated with the projections 11m and 11n, respectively. Thereby, the above flexible coupling 10 can be further made lighter. It is needless to say that the above projections 11m and 11n project in directions orthogonal to each other.

According to this embodiment, since the motor 3 is connected to the wheel 2 by the flexible coupling 10 constituted such that the motor-side plate 11A and the intermediate plate 11B are connected to each other by the first rubber members 12a having a substantially rectangular shape in plan view in such a manner that they can move relative to each other in the direction (direction B) orthogonal to the connection direction, and the above intermediate plate 11B and the wheel-side plate 11C are connected to each other by the second rubber members 12b like the above first rubber member 12a in such a manner that they can move relative to each other in the direction (direction A) orthogonal to the above direction B, even when the motor shaft and the wheel shaft become eccentric to each other, the drive torque of the motor 3 can be transmitted to the wheel 2 without fail. Since this flexible coupling 10 is simple in structure and has a small number of parts, it can be easily assembled, thereby making it possible to enhance work efficiency and improve productivity.

Although the wheel-side plate 11C is directly connected to the wheel 2 in the above embodiment, even when the wheel-side plate 11C is connected to the hub 4 connected to the wheel 2 at its rotary shaft, the same effect can be obtained.

Figure 3A:
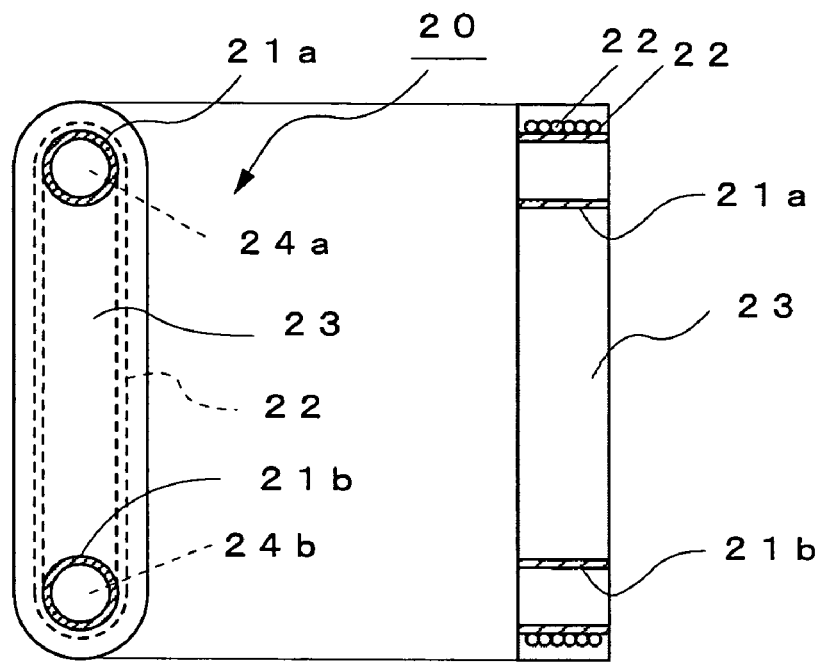
FIGS. 3(a) to 3(c) are diagrams showing the constitution of another plate connection member according to the present invention.
Figure 3B:
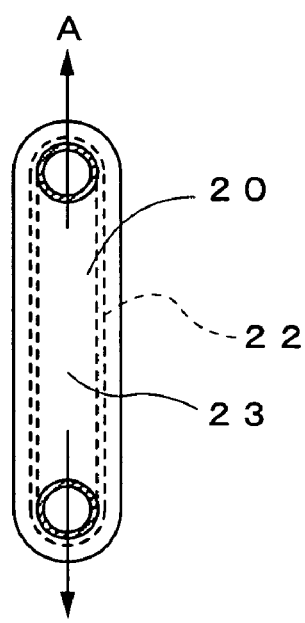
Figure 3C:
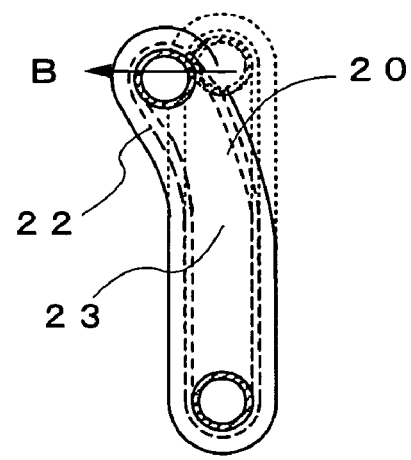

In the above embodiment, the motor-side plate 11A and the intermediate plate 11B are interconnected by the above rubber members 12a having a substantially rectangular shape in plan view and the intermediate plate 11B and the wheel-side plate 11C are interconnected by the rubbers members 12b having a substantially rectangular shape in plan view in such a manner that they can move in the cross direction of the above rubber members 12a and 12b. As shown in FIG. 3(a), in place of the above rubber members 12a and 12b, an elastic member 20 molded out of a molding material 23 such as rubber or resin after a wire 22 such as thread, nylon cord or steel cord are wound between metal fittings 21a and 21b may be mated with the pin members 24a and 24b of the unshown motor-side plate 11A, intermediate plate 11B and wheel-side plate 11C. Since the above elastic member 20 has high stiffness in the direction (direction A) of connecting the above pin members 24a and 24b but low stiffness in the direction B orthogonal to the direction A as shown in FIGS. 3(b) and 3(c), like the above rubber members 12a and 12b, even when the motor shaft and the wheel shaft become eccentric to each other, the drive torque of the motor 3 can be transmitted to the wheel 2 without fail. After the wire material 22 is wound round the pin members 24a and 24b by omitting the above metal fittings 21a and 21b, the wound portion of the above wire material 22 may be molded out of rubber or resin.

Resin members may be used in place of the above rubber members 12a and 12b and a wire material having stiffness such as a steel cord or steel wire may be wound between the above pin members 13a and 13b and between the pin members 14b and 14c.

Figure 4A:
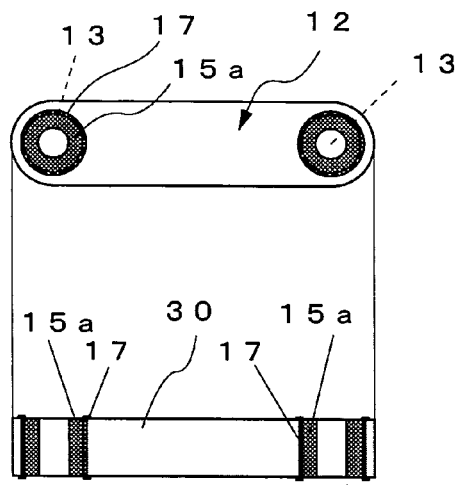
FIGS. 4(a) and 4(b) are diagrams showing the constitution of still another plate connection member according to the present invention.
Figure 4B:
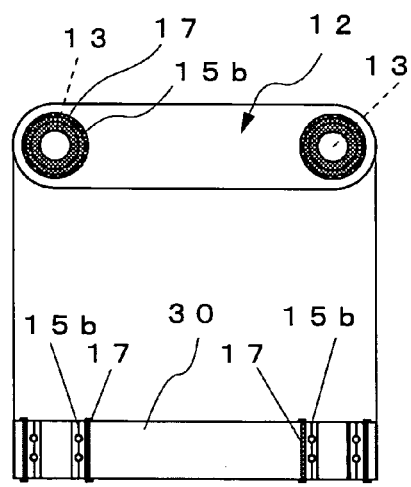
Figure 5A:
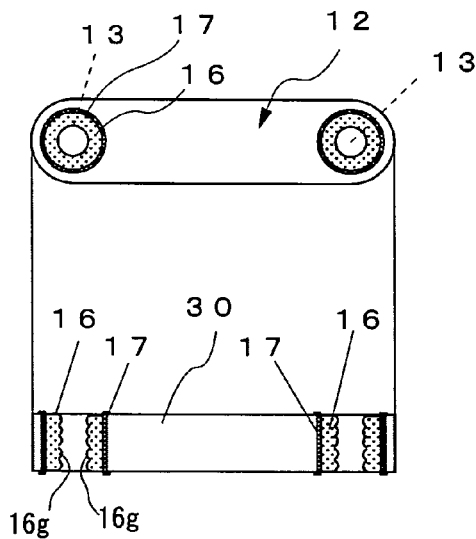
FIGS. 5(a) and 5(b) are diagrams showing the constitution of a further plate connection member according to the present invention.
Figure 5B:
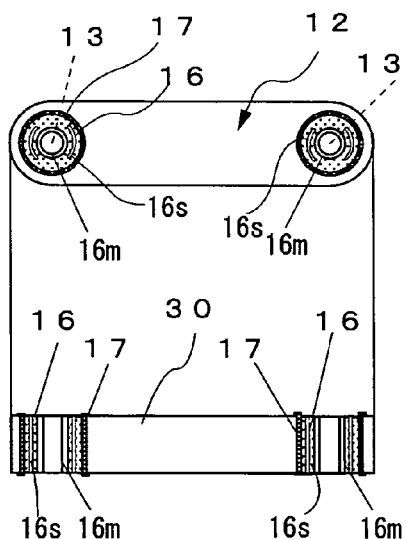
Figure 6:
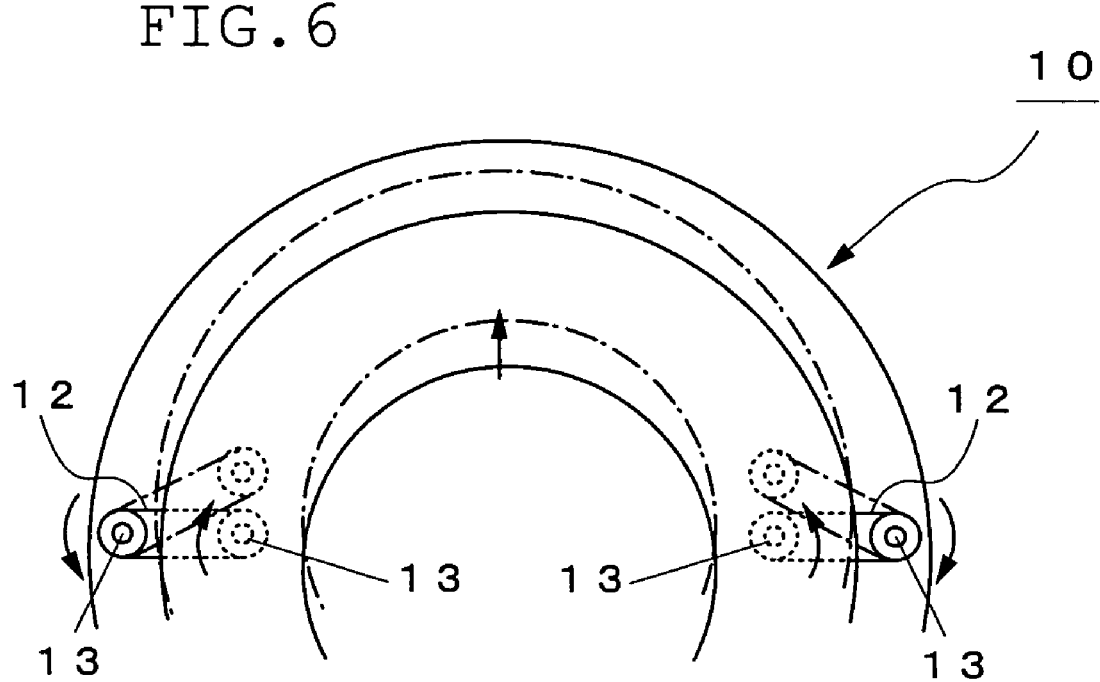
FIG. 6 is a diagram showing the movements of plate connection members having a bearing.

Further, when connection members 12 such as the above rubber members 12a and 12b or the above elastic members 20 are mated with the pin members 13 through a bearing such as a dry bearing (slide bush) 15a or a ball bearing 15b as shown in FIGS. 4(a) and 4(b) or through a rubber bush 16 as shown in FIGS. 5(a) and 5(b), the rotations of the above connection members 12 and the above pin members 13 as fixed shafts become smooth during the stroke of the flexible coupling 10, whereby the movement of the above flexible coupling 10 becomes smooth, thereby making it possible to further improve power transmission efficiency.

When grease 16g is made existent between the above pin member 13 and the rubber bush 16 as shown in FIG. 5(a) or an inner cylinder 16m is provided as shown in FIG. 5(b) to set the rubber bush 16, the rotations of the above pin members 13 and the above connection members 12 can be made smoother.

When a cavity 16g is formed in the above rubber bush 16 at this point, the rotations become much smoother.

In FIGS. 4(a) and 4(b) and FIGS. 5(a) and 5(b), reference numeral 17 denotes a holding metal fitting for fixing the above bearings 15a and 15b or the above rubber bush 16 in the above connection member 12.

When the above connection member 12 is attached to the above plates 11A to 11C while it is compressed in the lengthwise direction which is the connection direction, the movements of the plates 11A and 11B and the plates 11B and 11C can be made smoother and the stroke can be made long, which makes it possible to cope with the input of large vibration.

Figure 7A:
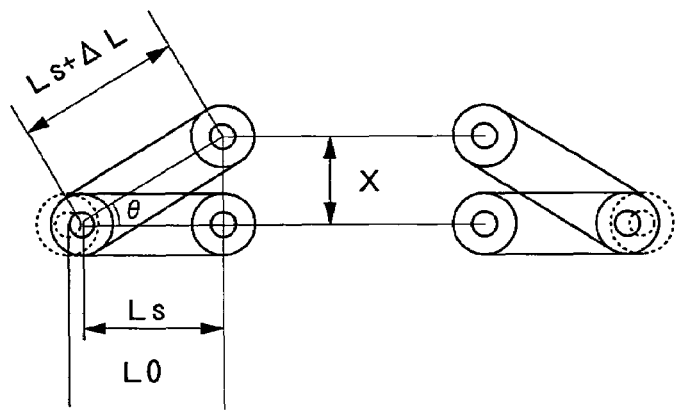
FIGS. 7(a) to 7(d) are diagrams for explaining the operation of the plate connection members when they are mounted in the connection direction while they are compressed.
Figure 7B:
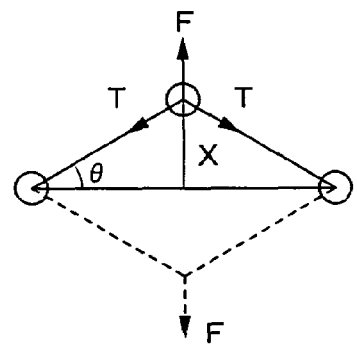
Figure 7C:
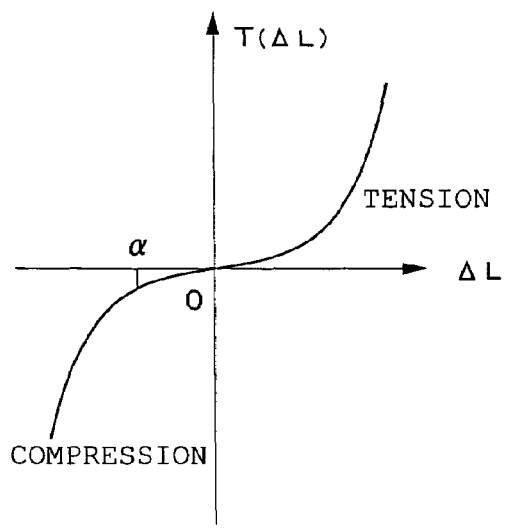
Figure 7D:
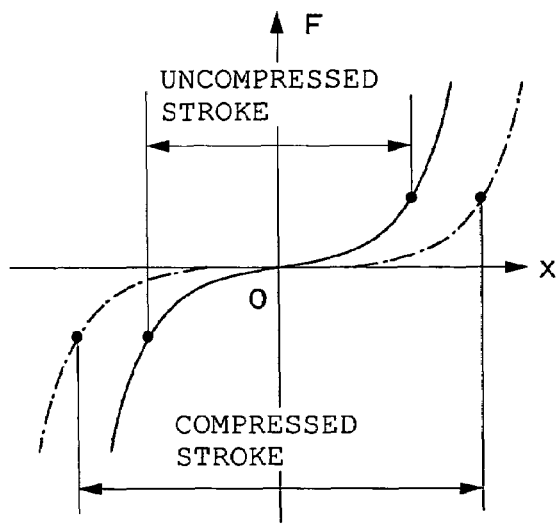
Figure 8:
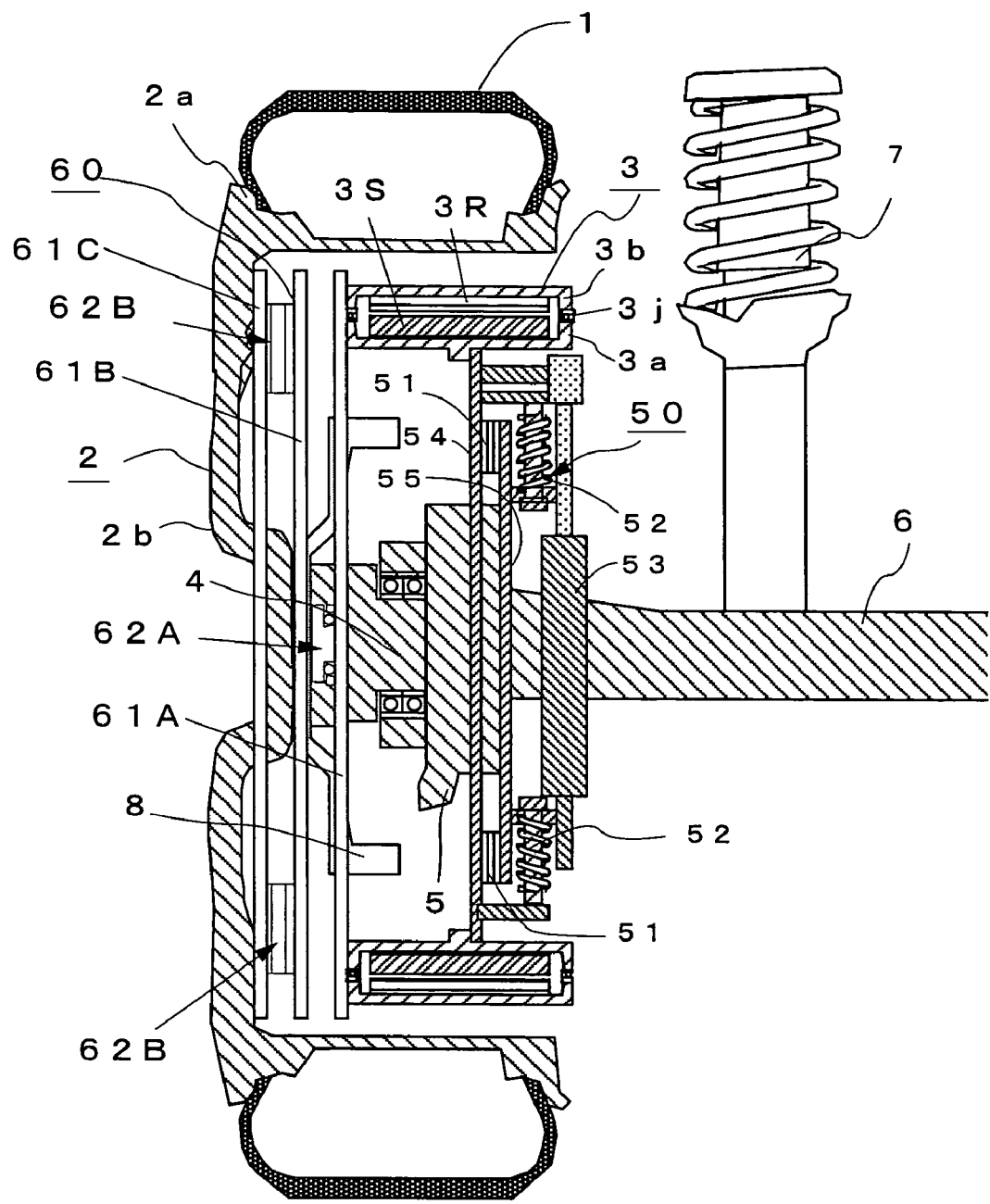
FIG. 8 is a diagram showing the constitution of a conventional in-wheel motor of the prior art.
Figure 9:
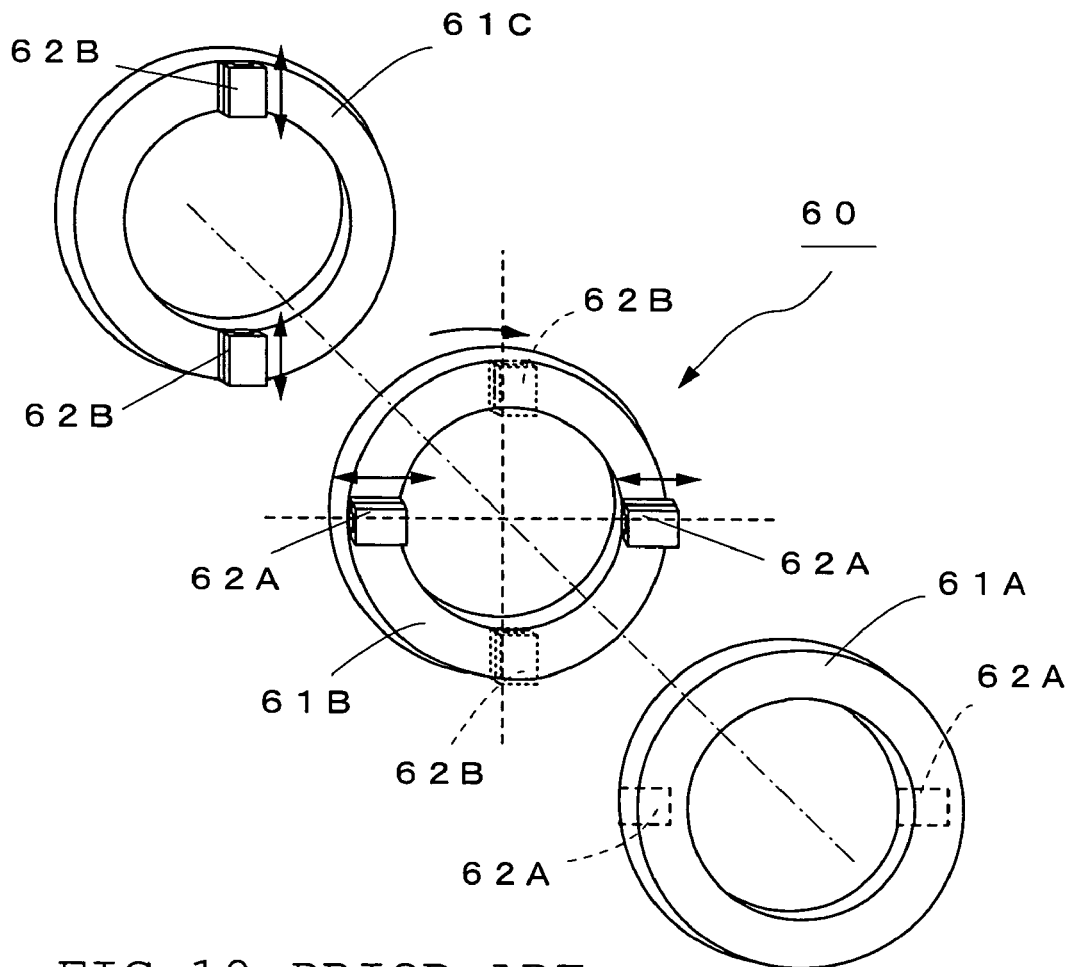
FIG. 9 is a diagram showing the constitution of a conventional flexible coupling of the prior art.
Figure 10:
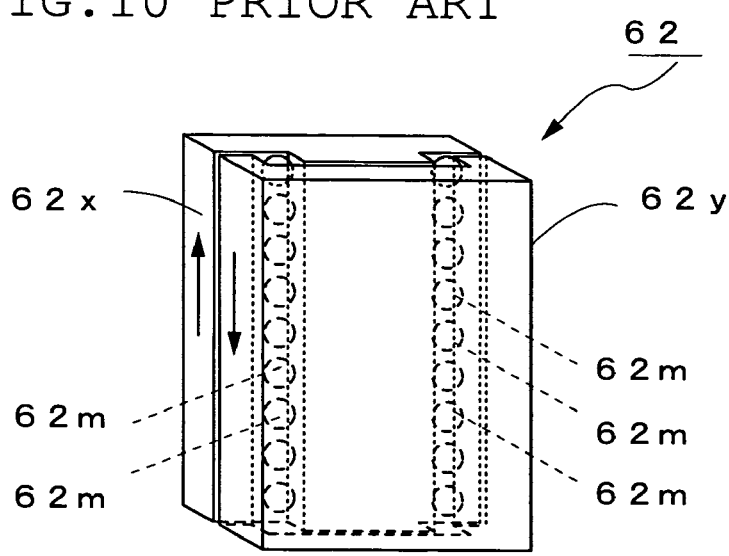
FIG. 10 is a diagram showing an example of a direct-acting guide.

That is, when the natural length of the connection member 12 is represented by $L_0$, the set length of the connection member 12 is represented by $L_s$, and the interconnected plates are displaced by X in the direction (vertical direction in the figures) orthogonal to the lengthwise direction of the above rubber members 12, the lengths L of the right and left connection members 12 and 12 become $L=L_s+\Delta L=X/\sin\theta$. Tension force $T(\Delta L)$ is applied to the above connection members 12 and 12 according to this elongation $\Delta L$. Since the resultant force of this tension balances with force F for vibrating the plates in the vertical direction as shown in FIG. 7(b), the size of the above force F becomes $F=2T(\Delta L)\sin\theta=2T(\Delta L)\cdot X/(L_s+\Delta L)$. As the above $T(\Delta L)$ and $\Delta L$ have the same relationship as the general relationship between the amount of distortion and tension as shown in FIG. 7(c), when the above connection members 12 and 12 are compressed by $\alpha$ in advance, the relationship between F and X becomes $F=2T(\Delta L-\alpha)\cdot X/(L_0+\Delta L-\alpha)$. Therefore, when the tolerance of the above force F is made constant as shown in FIG. 7(d), the width of displacement X, that is, the length of stroke can be made longer than when the connection member 12 is not compressed.

Thereby, when a large displacement is input, it can be handled, and the above connection members 12 and 12 can move easily and the plates can be moved smoothly in the vertical direction as tension is made smaller for the same displacement X by adding compression when the above force F is relatively small. Since tension becomes large suddenly when the tolerance of the above force F is reached, the movement at a movable limit can be suppressed.

INDUSTRIAL FEASIBILITY

As having been described above, according to the present invention, since the motor rotor and the wheel or the hub are interconnected by a flexible coupling which has a small number of parts and can be easily assembled, productivity can be improved and an in-wheel motor can be manufactured at a low cost.

What is claimed is:

1. An in-wheel motor system having a hollow direct drive motor which is provided in a wheel and whose stator side is supported to a part around the wheel of a vehicle by elastic bodies and/or an attenuation mechanism, wherein
a motor rotor and a wheel or a hub are interconnected by a coupling mechanism which comprises a motor-side plate connected to a rotating side case of the motor, a wheel-side plate connected to the wheel or hub, an intermediate plate interposed between the two plates, and first and second connection members for interconnecting the motor-side plate and the intermediate plate and interconnecting the intermediate plate and the wheel-side plate in such a manner that the interconnected plates can move relative to each other in a direction where the stiffness of the connection members themselves is low, the first and second connection members being arranged such that the directions where they have low stiffness become orthogonal to each other.

2. The in-wheel motor system according to claim 1, wherein at least one pair of either one or both of the first and second connection members are provided, and the paired connection members are arranged at positions where they become symmetrical to the center line of the plane of the plates.

3. The in-wheel motor system according to claim 1 or 2, wherein the first and second connection members are made of rubber or resin whose length in the connection direction is larger than the length in the direction orthogonal to the connection direction.

4. The in-wheel motor system according to claim 1 or 2, wherein pin members are provided on the opposed surfaces of the motor-side plate and the intermediate plate on the opposed surfaces of the intermediate plate and the wheel-side plate interconnected by a steel cord or steel wire.

5. The in-wheel motor system according to any one of claims 1 to 4, wherein the first and second connection members are attached to the respective plates through a bearing or rubber bush.

6. The in-wheel motor system according to any one of claims 1 to 5, wherein the first and second connection members are attached to the respective plates while they are compressed in the connection direction.

* * * * *